United States Patent [19]

Rossire

[11] 3,748,016
[45] July 24, 1973

[54] IMAGE TRANSMISSION AND PRESENTATION DEVICE

[75] Inventor: F. Henry Rossire, Salisbury, Conn.

[73] Assignee: The Bendix Corporation, Teterboro, N.J.

[22] Filed: Dec. 22, 1971

[21] Appl. No.: 210,845

[52] U.S. Cl. .............................. 350/96 B, 350/174
[51] Int. Cl. ............................................ G02b 5/16
[58] Field of Search ........................ 350/96 B, 174

[56] References Cited
UNITED STATES PATENTS

| | | | |
|---|---|---|---|
| 3,609,016 | 9/1971 | Jampolsky | 350/96 B X |
| 3,446,916 | 5/1969 | Abel et al. | 350/96 B X |
| 3,504,984 | 4/1970 | Bush | 350/96 B X |
| 2,872,840 | 2/1959 | Stanton | 350/174 |
| 3,059,519 | 10/1962 | Stanton | 350/145 |
| 3,142,235 | 7/1964 | Siegmund | 350/96 B X |
| 3,216,778 | 11/1965 | Davies et al. | 350/96 B X |
| 3,244,878 | 4/1966 | Stein et al. | 350/96 B X |
| 3,410,638 | 11/1968 | Langworthy | 350/96 B X |

FOREIGN PATENTS OR APPLICATIONS

| 1,922,924 | 11/1970 | Germany | 350/96 B |
|---|---|---|---|

Primary Examiner—David H. Rubin
Attorney—Anthony F. Cuoco et al.

[57] ABSTRACT

Means for employing fiber optics in conjunction with a user's head piece for transmitting visual information from a remote source and for superimposing said information in the user's field of vision without altering his range of vision.

1 Claim, 1 Drawing Figure

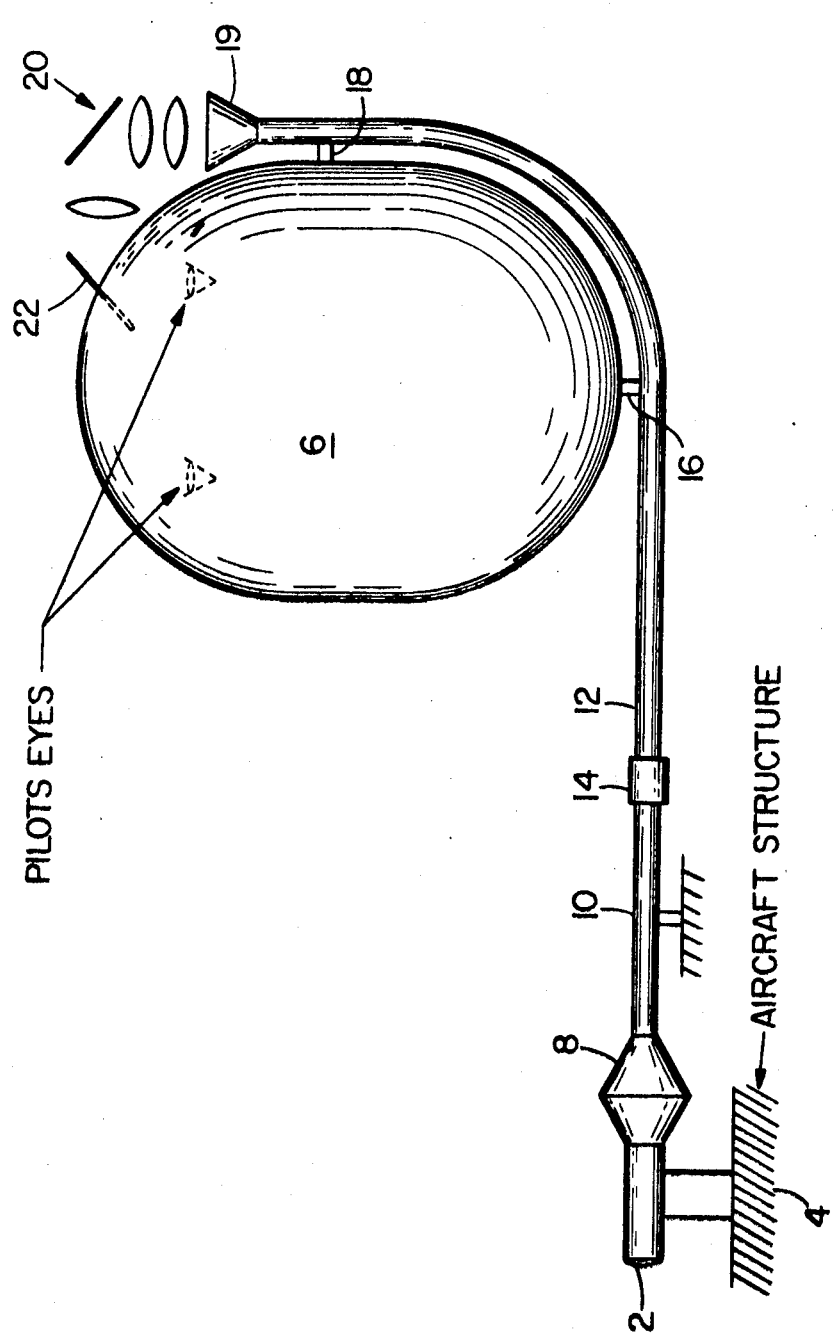

IMAGE TRANSMISSION AND PRESENTATION DEVICE

BACKGROUND OF THE INVENTION

1. Field of the Invention

This invention relates generally to image transfer and presentation means and more particularly to means of the type described employing fiber optics.

2. Description of the Prior Art

Modern aircraft control systems require that visual information be presented to the pilot of the craft without requiring repeated changes in eye focus and line of sight to fully comprehend the visual aspects of a particular control situation. Prior to the present invention this has been accomplished by a cathode ray tube (CRT) and associated optics arranged on the helmet or head piece of the pilot as described in U.S. Pat. No. 2,872,840 issued Feb. 10, 1959 to A. Stanton. Such arrangement has obvious disadvantages. The size of the equipment is a hinderance to the pilot as is the weight added to the helmet. High voltage for CRT operation is close to the pilot's head and extensive cabling is required to be connected to the helmet.

SUMMARY OF THE INVENTION

This invention contemplates a helmet using fiber optics image transfer means. A cathode ray tube is mounted remote from the helmet and the image is first transmitted through input or reducing fiber optics and then transmitted through a fiber optics conduit adjacent the pilot's helmet to output or magnifying fiber optics in association with an optical lens system which presents the image in the pilot's field of vision. Only the optical lens system, the output fiber optics and one end of the image conduit are attached to the helmet.

One object of this invention is to provide means for transmitting images from a remote point and for presenting said images in the field of vision of a user without requiring alteration of the users line of sight.

Another object of this invention is to use fiber optics in a device of the type described.

Another object of this invention is to provide image transmission and presentation means of the type described in conjunction with a helmet worn by the user and requiring a minimum number of components to be attached to the helmet.

Another object of this invention is to remove high voltage components from close proximity to the user and to reduce the hinderance to the user that otherwise results from devices of the type now known in the art.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The single FIGURE in the drawing is a schematic diagram of a device according to the invention.

DESCRIPTION OF THE INVENTION

A conventional type cathode ray tube 2 is mounted to aircraft structure 4 remote from a pilot's head piece or helmet 6. Cathode ray tube 2 may display aircraft navigational information in a manner described in U.S. Pat. 3,573,827 issued on Apr. 6, 1971 to I. DeBotton and A. Simon and assigned to The Bendix Corporation, assignee of the present invention.

An input tapered optical fiber bundle 8 is positioned in relation to the screen of cathode ray tube 2 so as to reduce the image therefrom. The reduced image is transmitted through a fiber optical conduit 10, which may be suitably mounted to aircraft structure 4 and connected to optical bundle 8, and a fiber optical conduit 12. Conduits 10 and 12, which are flexible and in the application being described may be as small as one-fourth inch in diameter, are connected through a suitable optical connector 14 and may be disconnected to permit the pilot to disengage the optical channel when leaving the aircraft or when otherwise not requiring the use of said channel as will now be understood.

Optical conduit 12, which conforms generally to the contour of helmet 6 is secured to the helmet by suitable means or standoffs 16 and 18 and is coupled at its free end to an output or magnifying tapered optical fiber bundle 19 which magnifies the image heretofore reduced by optical bundle 8 and transmitted through conduits 10 and 12. A collimating lens system 20 and an optical combiner 22 are mounted to the pilot's helmet by suitable means (not shown) for presenting the transmitted image in the pilot's line of sight without requiring alteration of the pilot's range of vision.

It will be understood that tapered optical fiber bundle 8, image conduits 10 and 12, conduit connector 14 and tapered optical fiber bundle 19 are devices well known in the art. The construction of optical bundles for image transmission is described in the Bendix Technical Journal, No. 2, Summer 1969, published by The Bendix Corporation, Bendix Center, Southfield, Mich. It will suffice to say for purpose of describing the present invention that the bundles are of the coherent type wherein the image is transmitted through each of the many fibers in the bundle independent of the neighboring fibers and the image at one end of the bundle is duplicated at the other end.

It will now be seen that the device of the invention offers several distinct advantages over prior art devices. Since cathode ray tube 2 is not attached to helmet 6 the amount of the equipment mounted to the helmet is minimized as is the weight of the helmet. The high voltage required for CRT operation is no longer close to the pilot and the necessary electrical cabling is removed from the helmet since image conduits 10 and 12 replace electrical control wires heretofore required.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An image transfer and presentation system in conjunction with a head piece worn by a user, comprising:
   a cathode ray tube supported for displaying the image;
   a tapered coherent bundle of optical fibers disposed adjacent the cathode ray tube for reducing the image therefrom;

a coherent optical fiber conduit coupled to the image reducing bundle;

said cathode ray tube, image reducing bundle and conduit supported remote from the head piece.

another coherent optical fiber conduit; means for removably coupling said conduit to the first mentioned conduit;

another tapered coherent bundle of optical fibers coupled to the second mentioned conduit for magnifying the reduced image transferred through said second and first mentioned conduits;

optical means arranged with said last mentioned optical bundle for presenting the magnified image therefrom in the focal plane of the user; and the second mentioned conduit and bundle and the optical means supported on the head piece worn by the user.

* * * * *